J. A. GLENN.
Horse Hay-Fork.
No. 90,256. Patented May 18, 1869.
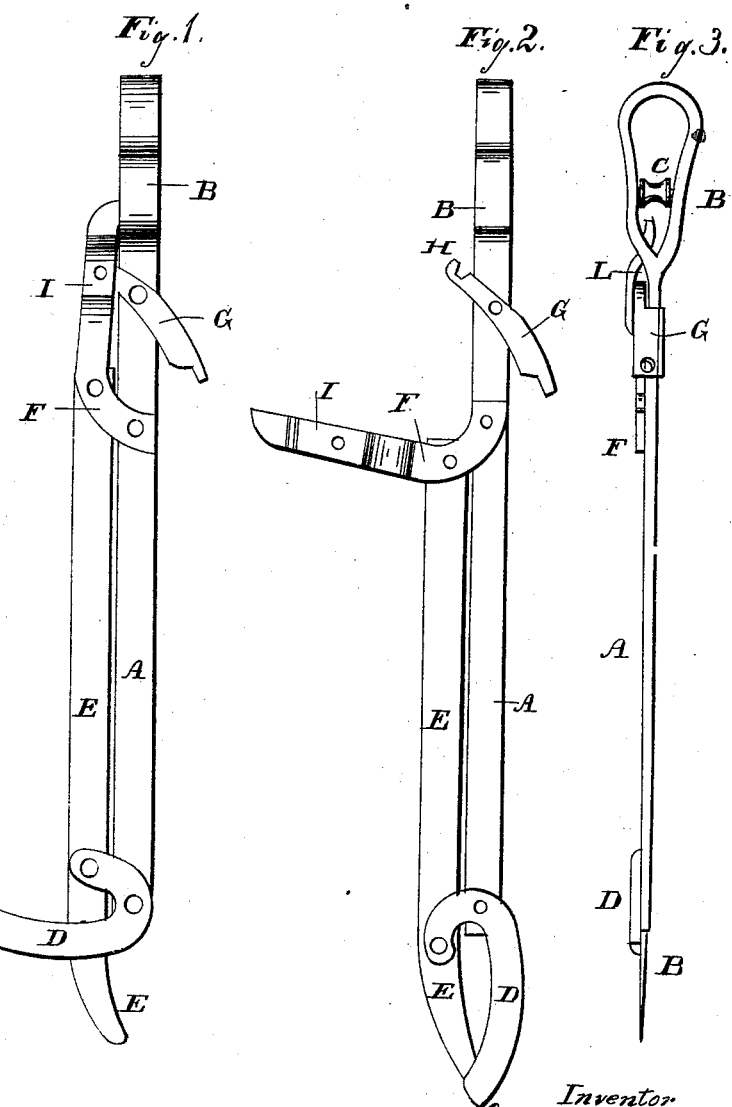

J. A. GLENN, OF WEST MIDDLESEX, PENNSYLVANIA.

Letters Patent No. 90,256, dated May 18, 1869.

---

IMPROVEMENT IN HORSE HAY-FORKS.

---

The Schedule referred to in these Letters Patent and making part of the same.

---

*To all whom it may concern:*

Be it known that I, J. A. GLENN, of West Middlesex, in the county of Mercer, and in the State of Pennsylvania, have invented certain new and useful Improvements in Horse Hay-Fork; and do hereby declare that the following is a full, clear, and exact description thereof, reference being had to the accompanying drawings, and to the letters of reference marked thereon.

The nature of my invention consists in the construction and arrangement of a "horse hay-fork," which will be hereinafter fully set forth.

In order to enable others skilled in the art to which my invention appertains, to make and use the same, I will now proceed to describe its construction and operation, referring to the annexed drawings, which form a part of this specification, and in which—

Figure 1 is a side view of the fork, showing it in position to hoist the hay;

Figure 2 is a side view, showing it in position to be thrust into the hay; and

Figure 3 is an edge view of the fork.

A represents a bar of suitable dimensions, having at its upper end a loop, B, forming the handle, to which the hoisting-rope is attached.

Inside of the handle B is a small pulley, C, as seen in fig. 3, over which the trip-rope passes.

To the lower end of the bar A is pivoted the hook D, which hook is made with one long and one short arm, the long arm being pointed so as to easily penetrate the hay.

The hook D is pivoted to the bar A.

At the bend of its two arms, and at the end of the shorter arm, the said hook is pivoted to a sliding bar, E, which is placed along the edge of the bar A.

The sliding bar E is at its lower end formed in the shape of a cutter, E', slightly bent inward from the point where the hook D is pivoted to the same.

The upper end of the bar E is pivoted to a bent lever, F, the inner end of which is pivoted to the bar A and the outer end bent upward and forming a loop, in which a pin, I, is placed.

On the bar A, just below the handle B, the trigger G is pivoted.

This trigger has a hook, H, at one end, as seen in fig. 2, which hook is so made that the pin I will catch on or fit in the same when the lever F is brought up against the upper end of the bar A.

If the lever F is turned downward, as shown in fig. 2, the long arm of the hook D is turned straight down, forming, with the cutter E' of the bar E, a suitable point for insertion in the hay.

When the fork is inserted in the hay, the lever F is raised up, and the trigger G so turned that its hook H catches on the pin I, which forces the hook D outward, as shown in fig. 1.

The hook D is held up in this position while the hay is being hoisted by the trigger G, and as soon as the fork has arrived at the mow, the trigger is tripped by the trip-rope, which is attached to the other end of the trigger, and passes over the pulley C downward.

The above-described invention is intended as an improvement upon my patent for horse hay-fork, dated December 1, 1868, and consists more particularly in the elongation of the sliding bar E beyond the extremity of the main bar A, and so curving the former bar, that when combined with the peculiar-shaped hook D, the two points will be about equal in length, and form a complete spear, as shown in fig. 2, when the fork enters the hay.

This hay-fork can be economically formed, and will be effectual in its operation.

What I claim as new, and desire to secure as an improvement, is—

The curved hook D, pivoted upon the extremity of the bar A, and upon the side of the elongated bar E, all constructed and operating substantially as set forth.

In testimony that I claim the foregoing, I have hereunto set my hand and seal, this 23d day of January, 1869.

J. A. GLENN. [L. S.]

Witnesses:
T. C. WHITE,
W. R. BURNETT.